United States Patent

Sullivan et al.

(10) Patent No.: US 8,213,154 B2
(45) Date of Patent: Jul. 3, 2012

(54) CO-DOPED NICKEL OXIDE

(75) Inventors: Michael B. Sullivan, Singapore (SG);
Jian Wei Zheng, Singapore (SG); Ping Wu, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 302 days.

(21) Appl. No.: 12/523,988

(22) PCT Filed: Jan. 22, 2008

(86) PCT No.: PCT/SG2008/000026
§ 371 (c)(1), (2), (4) Date: Dec. 8, 2009

(87) PCT Pub. No.: WO2008/091226
PCT Pub. Date: Jul. 31, 2008

(65) Prior Publication Data
US 2010/0208411 A1    Aug. 19, 2010

Related U.S. Application Data

(60) Provisional application No. 60/881,937, filed on Jan. 22, 2007.

(51) Int. Cl.
*H01G 4/06* (2006.01)
(52) U.S. Cl. ............ 361/321.5; 361/321.1; 361/321.4; 361/301.4; 361/311; 361/313; 501/136; 501/137; 501/139
(58) Field of Classification Search ............ 361/321.5, 361/321.2, 321.1, 321.4, 311–313, 301.4; 501/134–139
See application file for complete search history.

(56) References Cited

U.S. PATENT DOCUMENTS

| | | | | |
|---|---|---|---|---|
| 4,536,821 A | * | 8/1985 | Wheeler et al. | ............ 361/321.4 |
| 5,153,154 A | * | 10/1992 | Kato et al. | .................. 501/135 |
| 5,750,288 A | | 5/1998 | Xie et al. | |
| 7,381,496 B2 | * | 6/2008 | Onnerud et al. | ............ 429/231.1 |
| 2005/0277015 A1 | | 12/2005 | Xu et al. | |
| 2007/0116976 A1 | | 5/2007 | Tan et al. | |
| 2007/0117898 A1 | | 5/2007 | Tan et al. | |

FOREIGN PATENT DOCUMENTS

| | | |
|---|---|---|
| JP | 5-198301 | 8/1993 |
| JP | 2001-35481 | 2/2001 |
| WO | 03/085751 A2 | 10/2003 |

OTHER PUBLICATIONS

International Search Report for International Application No. PCT/SG2008/000026, mailed on Feb. 4, 2008 (4 pages).
esp@cenet patent abstract for Japanese Publication No. 2001035481, Publication date Feb. 9, 2001 (1 page).
esp@cenet patent abstract for Japanese Publication No. 5198301, Publication date Aug. 6, 1993 (1 page).

* cited by examiner

*Primary Examiner* — Nguyen T Ha
(74) *Attorney, Agent, or Firm* — Osha·Liang LLP (57) ABSTRACT

A nickel oxide that is co-doped with a first alkali metal dopant and a second metal dopant may be used, for example, to form a dielectric material in an electronic device. The dielectric material may be used, for example, in a capacitor. The second metal dopant of the nickel oxide may be, for example, tin, antimony, indium, tungsten, iridium, scandium, gallium, vanadium, chromium, gold, yttrium, lanthanum, ruthenium, rhodium, molybdenum or niobium.

20 Claims, 10 Drawing Sheets

CO-DOPED NICKEL OXIDE

TECHNICAL FIELD

The present invention generally relates to a co-doped nickel oxide and to a dielectric material comprising the co-doped nickel oxide. The present invention also relates to the use of the dielectric material in an electronic device.

BACKGROUND

Technological advancements in the field of microelectronics have led to a burgeoning interest in the development of small sized electronic components with better processing efficiency than their larger counter parts. The abundance of prospective applications that exist when electronic components are of reduced size has also fuelled a continuous push for the miniaturization of electronics.

A typical electronic system contains passive components (passives), like resistors, inductors and capacitors, and active integrated circuits (ICs). The number of discrete passives outnumbers ICs by several times and occupies more than 70% of the area of the IC substrate. Discrete passives have already become the major barrier to the miniaturization of electronic systems. The integration of passives is an emerging development theme in the development of the next generation of electronic systems.

Due to the large quantity of capacitors in ICs, the integration of smaller sized capacitors is of much importance. At the same time, the development of microelectronics requires decoupling capacitors with higher capacitance and shorter distance from its serving components. All of these require new dielectric materials with relatively high dielectric constant.

In the miniaturization of electronic circuitry components, transistor size, which is a key semiconductor component in electronic circuitry, has to be reduced. In order to do this, while still maintaining a desirable value of capacitance, the thickness of the gate oxide dielectric has to be decreased to offset the decrease in transitor area, so that the net gate capacitance is sufficient to sustain the current flow in the circuitry. However it is known that when the thickness of the gate dielectric decreases, leakage currents increases resulting in electrical and power inefficiency and subsequently poor device performance. A solution to this is to replace the convention silicon dioxide gate dielectric with a high-κ material which allows increased gate capacitance while minimizing undesirable current leakage.

Materials with high-κ values are known. Around the year 2000, a lead-free perovskite-like oxide $CaCu_3Ti_4O_{12}$ (CCTO) was reported with a dielectric constant of about $10^5$. More recently, lithium- and titanium-doped nickel oxide (LTNO) have received a considerable amount of attention for their gigantic dielectric constant that is better than CCTO and that has ignited further studies on aluminum (LANO) and silicon doping (LSNO).

However, the recent discovery of these known materials may not be sufficient due to the increasing demand for materials with high dielectric constant values for various applications. As these recently discovered materials may not be ideally compatible for use in certain microelectronic applications, alternative materials with high-κ values are required.

There is therefore a need to provide new materials with high dielectric constant.

There is a need to provide new high-k ceramic materials that overcomes, or at least ameliorates, one or more of the disadvantages described above.

SUMMARY

According to a first aspect, there is provided a nickel oxide co-doped with a first alkali metal dopant and a second metal dopant selected from the group consisting of at least one of tin, antimony, indium, tungsten, iridium, scandium, gallium, vanadium, chromium, gold, yttrium, lanthanum, ruthenium, rhodium, molybdenum and niobium.

Advantageously, the nickel oxide of the first aspect has a high dielectric constant. The dielectric constant of the nickel oxide may be at least about $10^3$, at least about $10^4$ or at least about $10^5$.

The nickel oxide may have a composition represented by the general formula (I):

$$R_v X_y Ni_z O \qquad (I)$$

wherein
R is the first alkali metal dopant;
X is the second metal dopant;
v, y and z are stoichiometric ratios and wherein
v is about $0.001 \leq v \leq 0.35$;
y is about $0.001 \leq y \leq 0.05$;
z is about $0.60 \leq z \leq 0.998$; and
wherein $v+y+z=1$.

In one embodiment, v is about $0.03 \leq v \leq 0.07$ and y is about $0.01 \leq y \leq 0.04$. In another embodiment, v is about 0.05 and y is about 0.02.

According to a second aspect, there is provided a dielectric material comprising a nickel oxide base co-doped with a first alkali metal dopant and a second metal dopant selected from the group consisting of at least one of tin, antimony, indium, tungsten, iridium, scandium, gallium, vanadium, chromium, gold, yttrium, lanthanum, ruthenium, rhodium, molybdenum and niobium.

According to a third aspect, there is provided a capacitor comprising a pair of electrodes and a layer of dielectric material disposed between said electrodes, wherein said dielectric material comprises a nickel oxide base co-doped with a first alkali metal dopant and a second metal dopant selected from the group consisting of at least one of tin, antimony, indium, tungsten, iridium, scandium, gallium, vanadium, chromium, gold, yttrium, lanthanum, ruthenium, rhodium, molybdenum and niobium.

According to a fourth aspect, there is provided a use of a dielectric material in at least one of an electronic device, a semiconductor and an energy storage device, wherein said dielectric material comprises a nickel oxide base co-doped with a first alkali metal dopant and a second metal dopant selected from the group consisting of at least one of tin, antimony, indium, tungsten, iridium, scandium, gallium, vanadium, chromium, gold, yttrium, lanthanum, ruthenium, rhodium, molybdenum and niobium.

Definitions

The following words and terms used herein shall have the meaning indicated:

The term "dielectric constant" is to be interpreted broadly to refer to the ratio of capacitance provided by a specified dielectric material to the capacitance of vacuum (or air).

The term "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Disclosure of Optional Embodiments

Exemplary, non-limiting embodiments of nickel oxide co-doped with a first alkali metal dopant and a second metal dopant selected from the group consisting of at least one of tin, antimony, indium, tungsten, iridium, scandium, gallium, vanadium, chromium, gold, yttrium, lanthanum, ruthenium, rhodium, molybdenum and niobium will now be disclosed.

The inventors have found that the above second metal dopants, when co-doped with a first alkali metal dopant as disclosed herein in nickel oxide systems, may result in a dielectric material with high dielectric constant.

The dielectric constant of the dielectric material may be at least about $10^3$, at least about $10^4$ or at least about $10^5$.

The second metal dopant may be selected from the group consisting of tin, antimony, indium, tungsten, iridium, scandium, gallium, vanadium, chromium, gold, yttrium, lanthanum, ruthenium, rhodium, molybdenum and niobium.

The nickel oxide may be co-doped with a first alkali metal dopant selected from the group consisting of lithium, sodium, potassium, rubidium, cesium and francium. In one embodiment, the alkali metal dopant is lithium. In another embodiment, the alkali metal dopant is sodium. In a further embodiment, the alkali metal dopant is potassium.

The nickel oxide may comprise more than one second metal dopant as the co-dopant. In one embodiment, the second metal dopant may be a combination of tin and antimony. The combination of tin and antimony may be co-doped with lithium into nickel oxide.

The doped nickel oxide may have a composition represented by the general formula (I):

$$R_v X_y Ni_z O \qquad (I),$$

where R is the first alkali metal dopant; X is the second metal dopant; v, y and z are stoichiometric ratios and wherein v is about $0.001 \leq v \leq 0.35$; y is about $0.001 \leq y \leq 0.05$; z is about $0.60 \leq z \leq 0.998$; and wherein v+y+z=1.

In one embodiment, v is about $0.03 \leq v \leq 0.07$ or v is about 0.05. In another embodiment, y is about $0.01 \leq y \leq 0.04$ or y is about 0.02. The resultant doped nickel oxide may have the formula $Li_{0.05}X_{0.02}Ni_{0.93}O$.

The resultant doped nickel oxide may be made by a number of processes such as solid state synthesis, sol-gel method, diffusion process and ion implantation techniques. It is to be noted that if the sol-gel method is used, the second metal dopant may be introduced as a soluble salt, or as a slightly insoluble salt. The second metal salt may be soluble, or slightly insoluble, when mixed with the reactants used in the sol-gel method. As is known to a person skilled in the art, the reactants used in the sol-gel method may comprise nickel nitrate or soluble nickel salts, lithium nitrate or soluble lithium salts, citric acid and water. Accordingly, the anion of the second metal salt may be selected from the group consisting of, but not limited to, acetate, chloride, fluoride, bromide, nitrate, chlorate, perchlorate, sulphate, sulphite and tert-butoxide.

It is to be appreciated that the concentration of the second metal salt to be used in the doping process would be obvious to a person skilled in the art without undue experimentation by working within the solubility limit.

The dielectric material comprising the doped nickel oxide may be used to form an electronic device, a semiconductor or an energy storage device. The electronic device may comprise a component selected from the group consisting of a transistor, a gate insulator, an integrated circuit, a microwave resonator, a piezoelectric transducer, an amplifier and a capacitor such as a ceramic capacitor. The energy storage device may be a capacitive energy storage device or an embedded energy storage device.

The capacitor may comprise a pair of electrodes and a layer of dielectric material comprising the doped nickel oxide disposed between the electrodes. The dielectric material may comprise the co-doped nickel oxide as the main component. In one embodiment, the co-doped nickel oxide may be at least 95% by weight of the dielectric material. The co-doped nickel oxide may comprise up to 25 molar %, up to 30 molar % or up to 35 molar % of the first alkali metal dopant. The co-doped nickel oxide may comprise up to 3 molar %, up to 4 molar % or up to 5 molar % of the second metal dopant. The co-doped nickel oxide may comprise up to 60 molar %, up to 65% molar %, up to 70 molar % or up to 75 molar % of the nickel oxide.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 13a is the SEM of titanium and lithium co-doped nickel oxide at a magnification of 2000× and FIG. 13b is the SEM of titanium and lithium co-doped nickel oxide at a magnification of 5000×. FIG. 13c and FIG. 13d are the SEM of titanium and lithium co-doped nickel oxide at a magnification of 10000×.

FIG. 14a and FIG. 14d are the SEM of indium and lithium co-doped nickel oxide at a magnification of 2000× and FIG. 14b is the SEM of indium and lithium co-doped nickel oxide at a magnification of 5000×. FIG. 14c is the SEM of indium and lithium co-doped nickel oxide at a magnification of 10000×.

FIG. 15a and FIG. 15b are the SEM of tin and lithium co-doped nickel oxide at a magnification of 2000× and FIG. 15c is the SEM of tin and lithium co-doped nickel oxide at a magnification of 5000×. FIG. 15d is the SEM of tin and lithium co-doped nickel oxide at a magnification of 10000×.

FIG. 16a is the SEM of antimony and lithium co-doped nickel oxide at a magnification of 2000× and FIG. 16b is the SEM of antimony and lithium co-doped nickel oxide at a magnification of 5000×. FIG. 16c is the SEM of antimony and lithium co-doped nickel oxide at a magnification of 10000×.

EXAMPLES

Non-limiting examples of the invention, including the best mode, and a comparative example will be further described in greater detail by reference to specific Examples, which should not be construed as in any way limiting the scope of the invention.

Example 1

Characterization of Titanium, Tin, Indium and Antimony Co-Doped Lithium NiO The lithium co-doped NiO was prepared via the following typical procedures. Firstly, 1 g citric acid (to achieve a pH value of about 2), 1.388 g $LiNO_3$ and 111.5195 g $Ni(NO_3)_2 \cdot 6H_2O$ were mixed together in 100 ml distilled (DI) water. The mixture was magnetically stirred to allow the precursors to completely dissolve in the DI water as evidenced by a clear solution. The appropriate dopant salts of titanium, tin, indium and antimony (for example, 2.7228 g tetrabutyl titanate ($[CH_3(CH_2)_3O]_4Ti$)) was then slowly added to the solution and heated to 80° C. The solution was stirred at this temperature until the excess water evaporated and the solution becomes gel. The gel was then calcined at 800° C. for approximately 1 hour, resulting in the formation of ultra fine powders. Subsequently, the ultra fine powders were compressed into pellets using ENERPAC manual Hydraulic press under 1500 PSI for about 5 minutes and then sintered at 1280° C. for 4 hours. The pellets were then characterized in terms of their dielectric constant, loss tangent, x-ray diffraction (XRD), x-ray photoelectron spectroscopy (XPS) and scanning electron microscopy (SEM).

Figure 1:
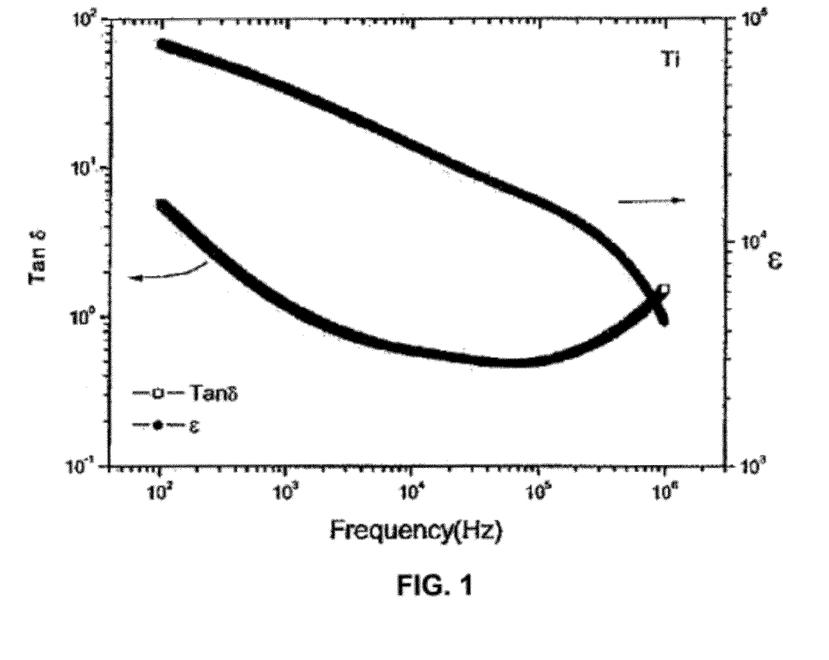
FIG. 1 shows the loss tangent and the dielectric constant with varying frequency for titanium and lithium co-doped nickel oxide.
Figure 2:
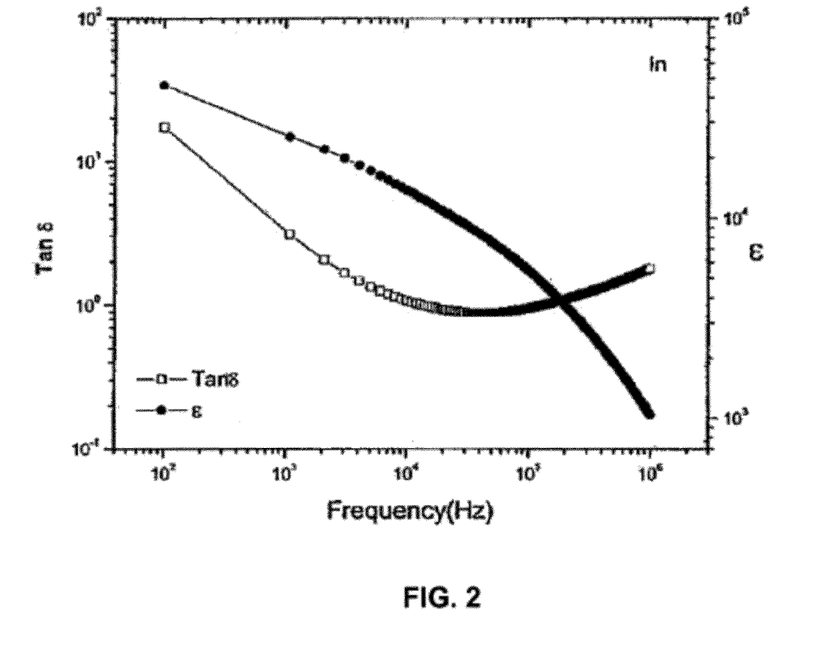
FIG. 2 shows the loss tangent and the dielectric constant with varying frequency for indium and lithium co-doped nickel oxide.
Figure 3:
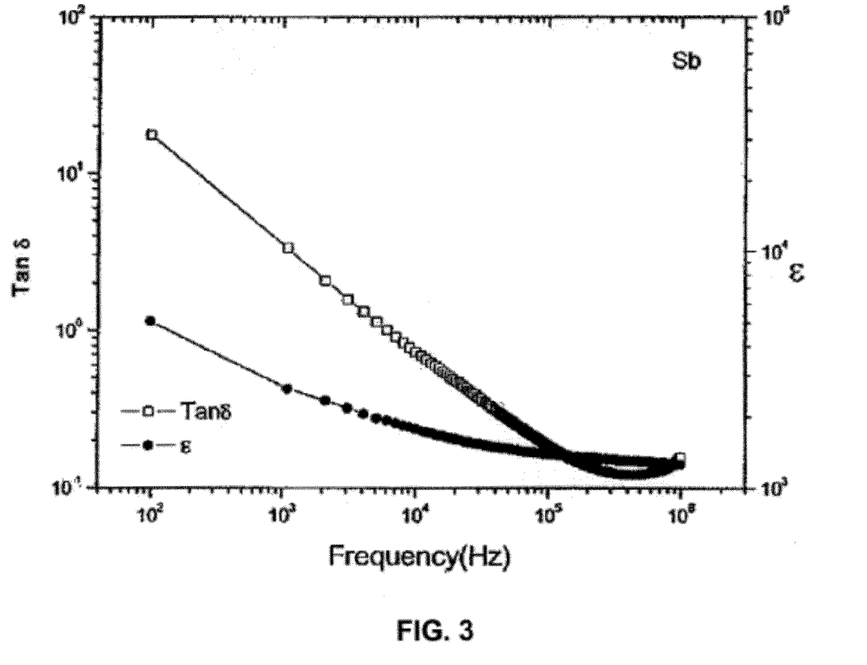
FIG. 3 shows the loss tangent and the dielectric constant with varying frequency for antimony and lithium co-doped nickel oxide.
Figure 4:
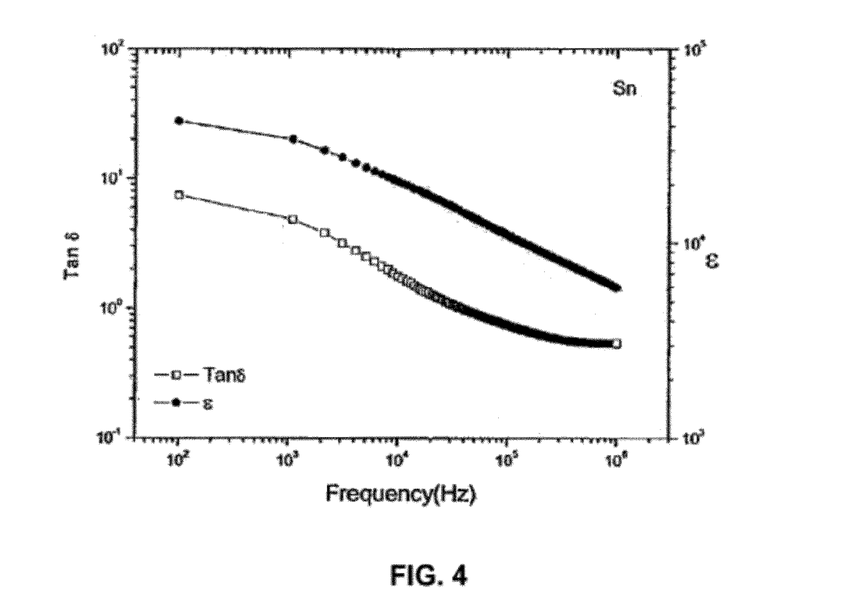
FIG. 4 shows the loss tangent and the dielectric constant with varying frequency for tin and lithium co-doped nickel oxide.
Figure 5:
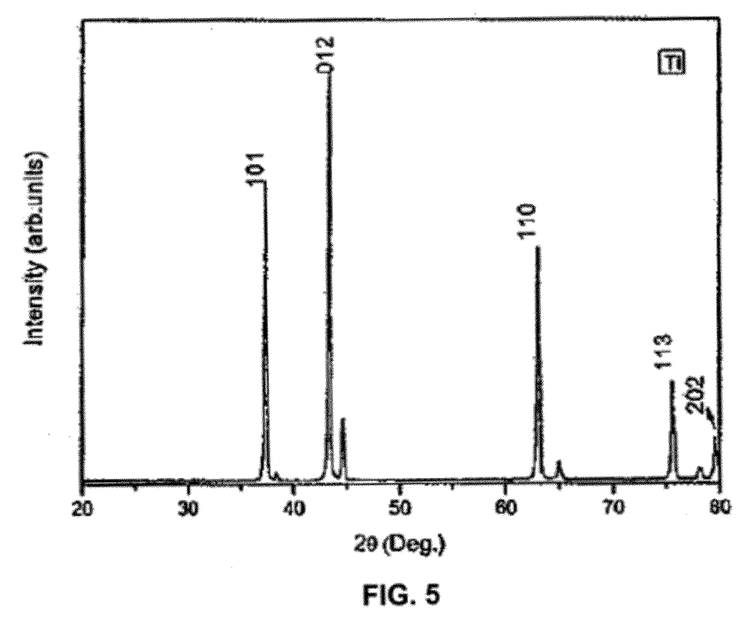
FIG. 5 is an X-Ray Diffraction (XRD) pattern of titanium and lithium co-doped nickel oxide.
Figure 6:
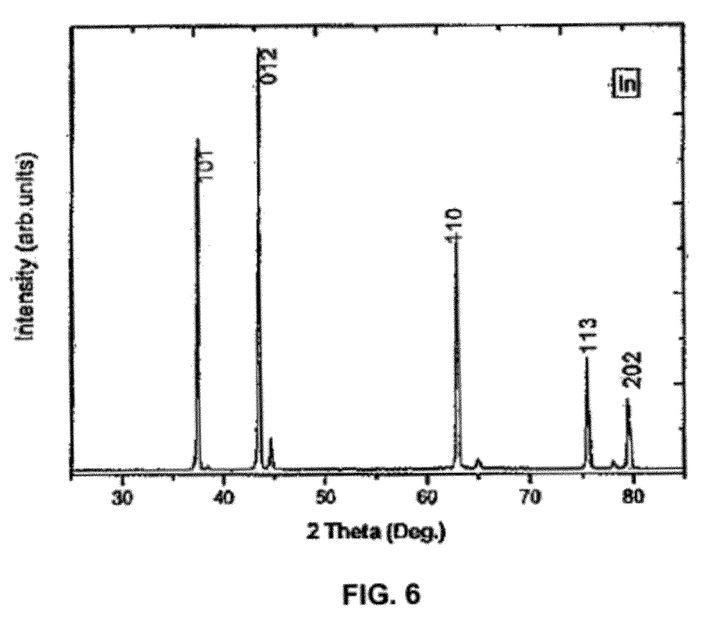
FIG. 6 is an X-Ray Diffraction (XRD) pattern of indium and lithium co-doped nickel oxide.
Figure 7:
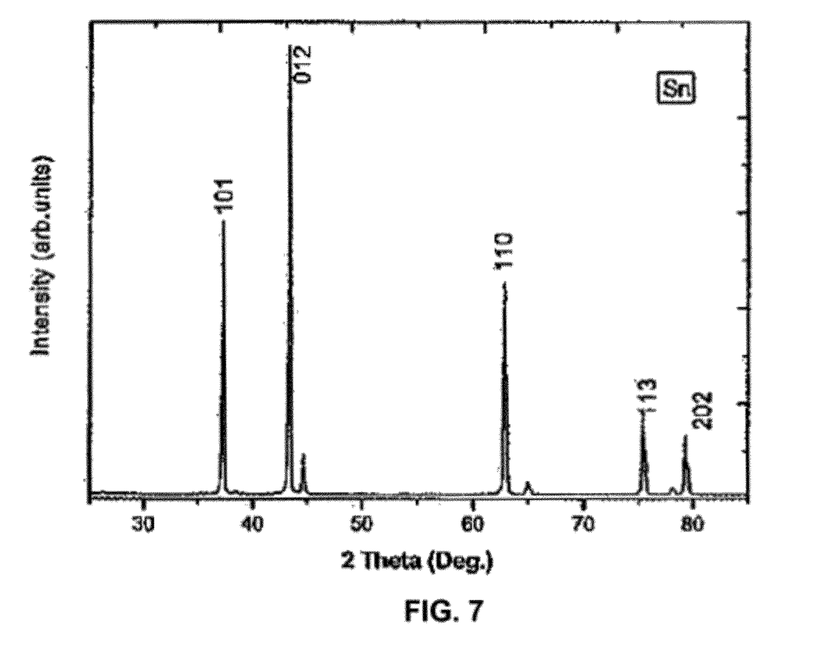
FIG. 7 is an X-Ray Diffraction (XRD) pattern of tin and lithium co-doped nickel oxide.
Figure 8:
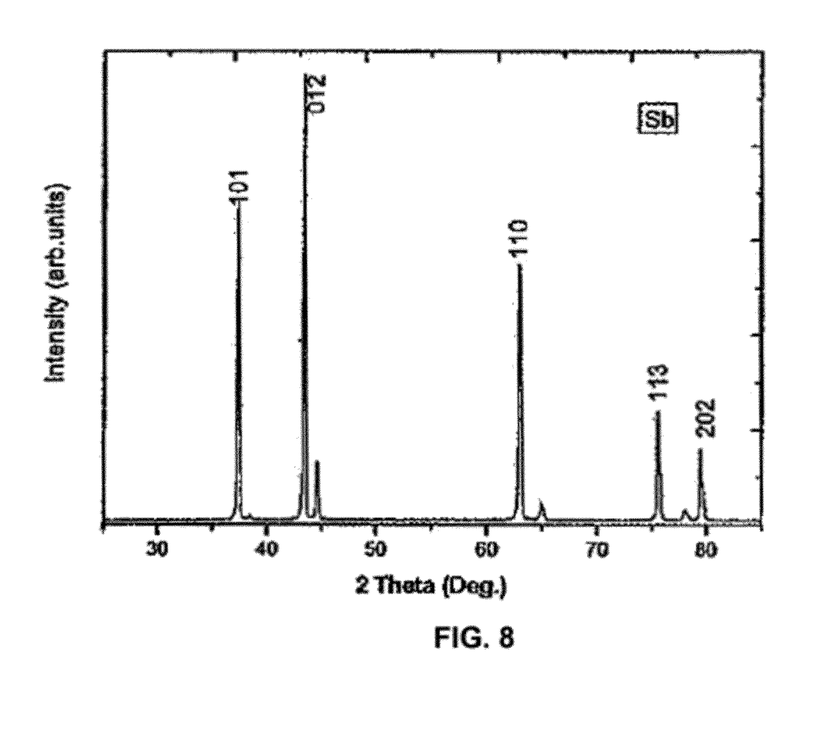
FIG. 8 is an X-Ray Diffraction (XRD) pattern of antimony and lithium co-doped nickel oxide.
Figure 9:
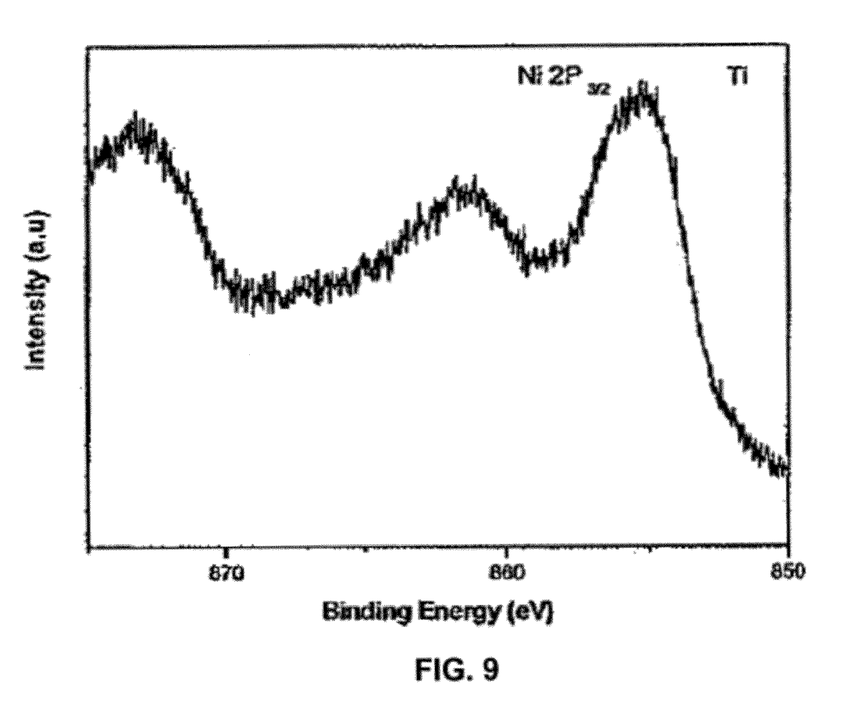
FIG. 9 is an X-Ray Photoelectron Spectroscopy (XPS) of titanium and lithium co-doped nickel oxide.
Figure 10:
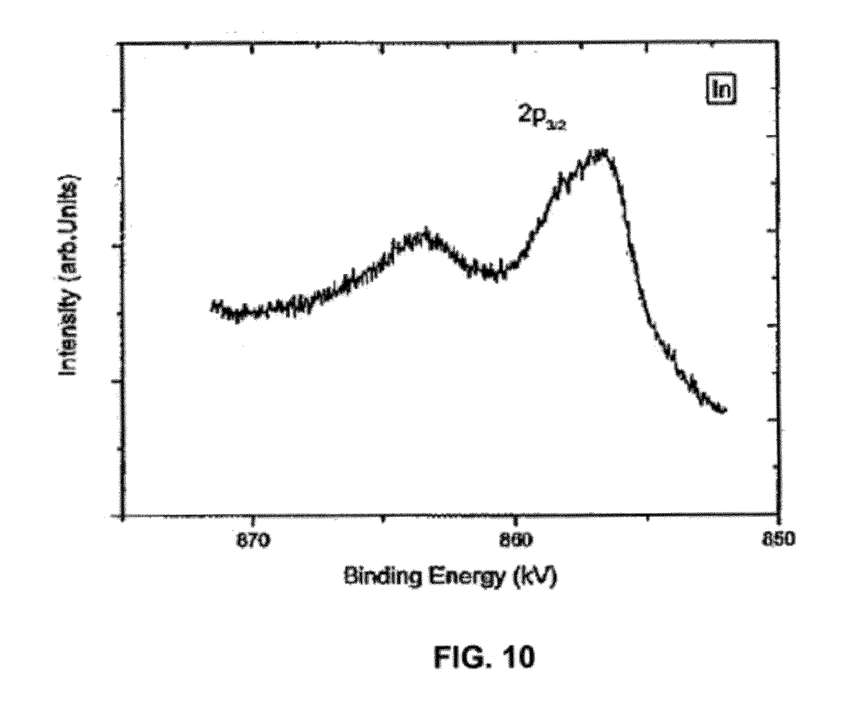
FIG. 10 is an X-Ray Photoelectron Spectroscopy (XPS) of indium and lithium co-doped nickel oxide.
Figure 11:
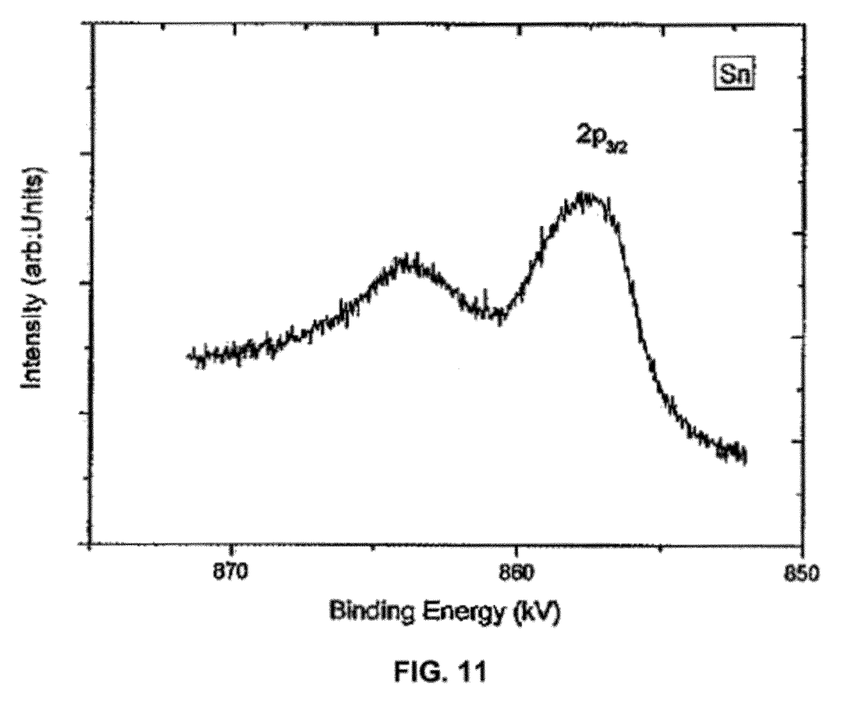
FIG. 11 is an X-Ray Photoelectron Spectroscopy (XPS) of tin and lithium co-doped nickel oxide.
Figure 12:
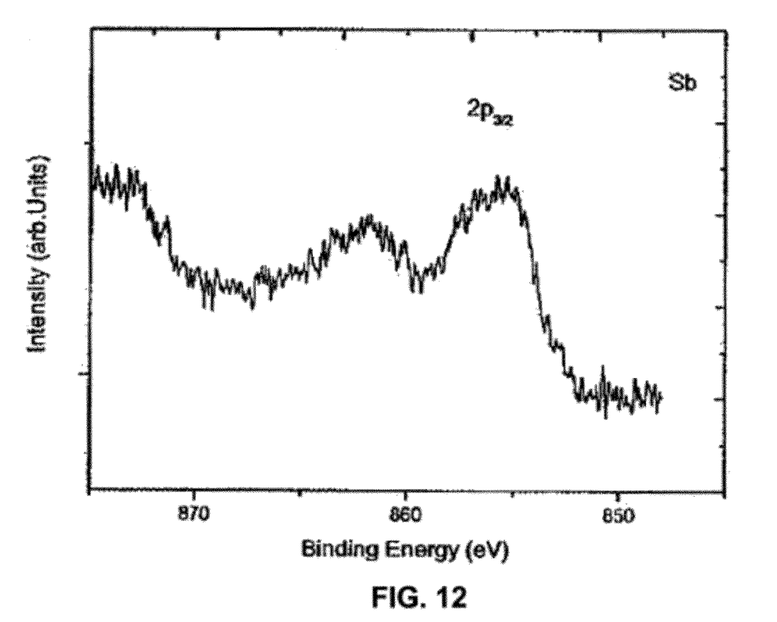
FIG. 12 is an X-Ray Photoelectron Spectroscopy (XPS) of antimony and lithium co-doped nickel oxide.
Figure 13:
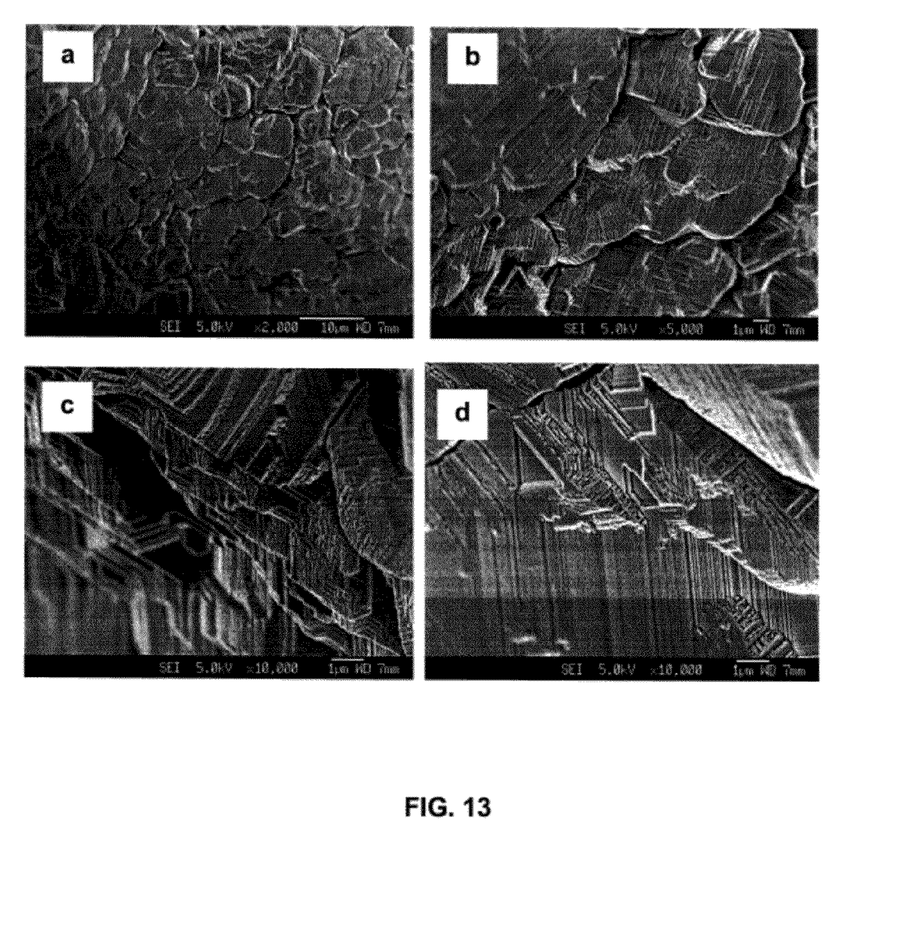
FIG. 13 shows Scanning Electron Microscopy (SEM) images of titanium and lithium co-doped nickel oxide.
Figure 14:
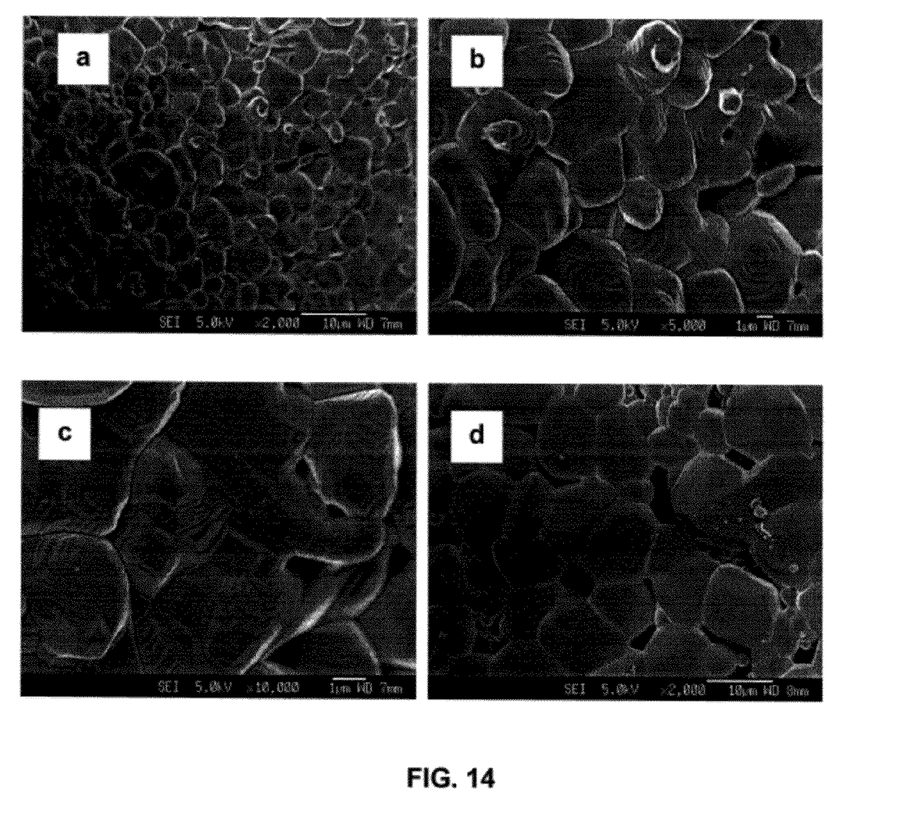
FIG. 14 shows Scanning Electron Microscopy (SEM) images of indium and lithium co-doped nickel oxides.
Figure 15:
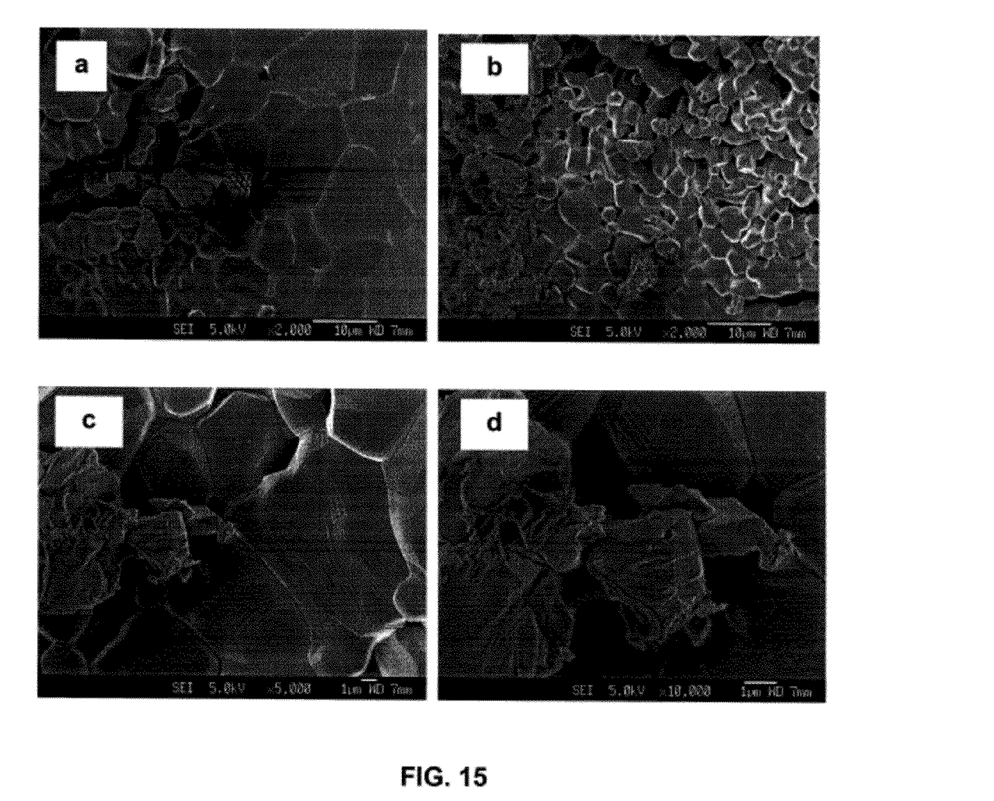
FIG. 15 shows Scanning Electron Microscopy (SEM) images of tin and lithium co-doped nickel oxide.
Figure 16:
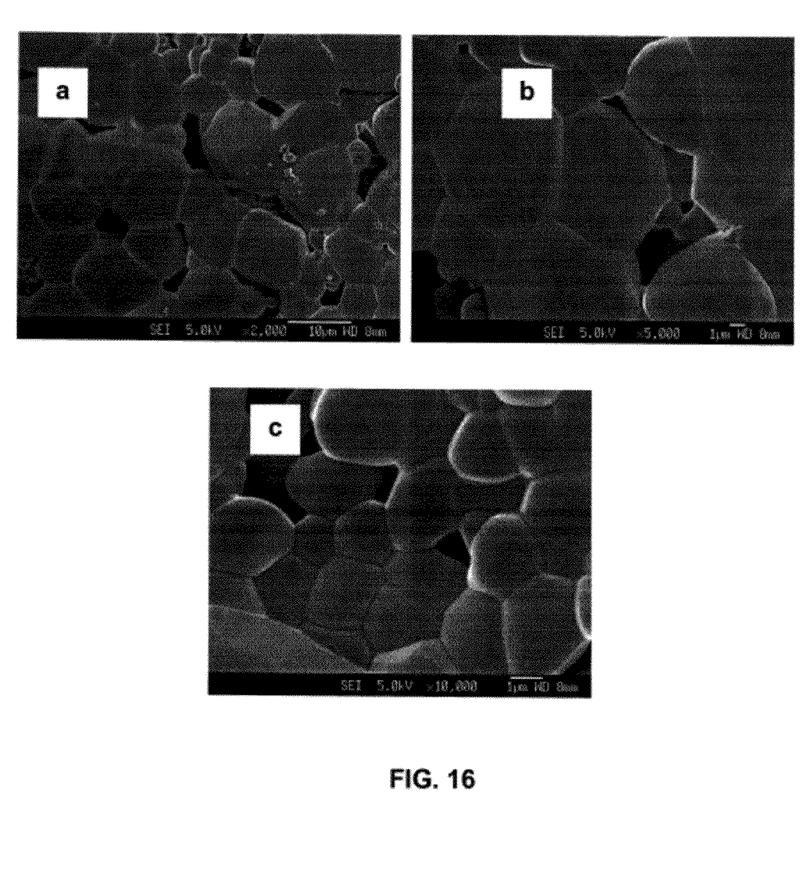
FIG. 16 shows Scanning Electron Microscopy (SEM) images of antimony and lithium co-doped nickel oxide.

The dielectric responses of the pellets were then measured using an impedance analyzer (Hewlett-Packard 4194A) in the frequency range of 0.1 to 1000 kHz at room temperature. FIG. 1. to FIG. 4 shows the variation of E and Tan δ against frequency for Ti, In, Sn and Sb co-doped LiNiO. From these results, it was observed that the NiO co-doped with Li and Sn showed better properties by less variation in both Tan δ and ∈ in the measured frequency range.

XRD analysis was employed to confirm whether the pellets achieved are a single phase of NiO-based solid solution. The XRD was performed on the sintered pellets in the 2θ range from 25° to 85° and results are shown in FIG. 5 to FIG. 8. All four samples had similar patterns with peaks corresponding to NiO in the measured 2θ range except for small intensity variations, indicating the absence of a second phase.

Individual X-Ray Photoelectron Spectroscopy (XPS) were carried out to identify the elements present in the samples and this was followed by a more detailed scan at the regions of interest (O, C, $Ni_2P$ etc). FIG. 9 to FIG. 12 depicts the XPS scan results for the four different pellets.

SEM was used to observe the ceramic microstructure of the four sample pellets. The detailed pictures obtained from SEM are shown in FIG. 13 to FIG. 16.

Applications

It will be appreciated that the disclosed materials exhibit high dielectric constant. Advantageously, these materials can be utilized in the manufacture of electronic circuitry components such that they are capable of being miniaturized without a loss in the desired capacitance.

More advantageously, with the use of the disclosed materials that have high dielectric constants, the thickness of the gate dielectric in transistors does not have to be reduced drastically in order to offset the decrease in capacitance, which is caused by the reduction of the surface area of the transistors during miniaturization. As a result, leakage currents due to tunneling will be substantially minimized and the complications of electrical and power inefficiency and subsequently poor device performance can be avoided.

The disclosed dielectric materials may also act as alternatives to known high dielectric material. Advantageously, the disclosed materials may also be used to substitute known high dielectric materials in applications where the known high dielectric materials are not compatible for use in these specific applications.

Advantageously, the disclosed high dielectric materials may be used in an electronic device, a semiconductor or an energy storage device. The electronic device may comprise a component selected from the group consisting of a transistor, a gate insulator, an integrated circuit, a microwave resonator, a piezoelectric transducer, an amplifier and a capacitor such as a ceramic capacitor. The energy storage device may be a capacitive energy storage device or an embedded energy storage device.

More advantageously, the disclosed high dielectric materials may serve as rudimentary starting points for future researches to be further carried out on these disclosed high dielectric materials, so that a material with an even higher dielectric constant may be derived from them.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A nickel oxide co-doped with a first alkali metal dopant and a second metal dopant, the nickel oxide having a composition represented by the general formula (I):

$$R_v X_y Ni_z O \qquad (I)$$

wherein
R is the first alkali metal dopant;
X is the second metal dopant selected from the group consisting of at least one of tin, antimony, indium, tungsten, iridium, scandium, gallium, vanadium, chromium, gold, yttrium, lanthanum, ruthenium, rhodium, molybdenum and niobium;
v, y and z are stoichiometric ratios and wherein
v is $0.001 \leq v \leq 0.35$;
y is $0.001 \leq y \leq 0.05$;
z is $0.60 \leq z \leq 0.998$; and
wherein v+y+z=1.

2. The nickel oxide of claim 1, wherein said alkali metal dopant is selected from the group consisting of lithium, sodium, potassium, rubidium, cesium and francium.

3. The nickel oxide of claim 1, having a dielectric constant of at least $10^3$.

4. The nickel oxide of claim 3, having a dielectric constant of at least $10^4$.

5. The nickel oxide of claim 4, having a dielectric constant of at least $10^5$.

6. The nickel oxide of claim 1, wherein v is $0.03 \leq v \leq 0.07$.

7. The nickel oxide of claim 1, wherein y is $0.01 \leq y \leq 0.04$.

8. The nickel oxide of claim 1, wherein v is about 0.05.

9. The nickel oxide of claim 1, wherein y is about 0.02.

10. A dielectric material comprising a nickel oxide base co-doped with a first alkali metal dopant and a second metal dopant selected from the group consisting of at least one of tin, antimony, indium, tungsten, iridium, scandium, gallium, vanadium, chromium, gold, yttrium, lanthanum, ruthenium, rhodium, molybdenum and niobium.

11. The dielectric material of claim 10, wherein said alkali metal dopant is selected from the group consisting of lithium, sodium, potassium, rubidium, cesium and francium.

12. The dielectric material of claim 10, having a dielectric constant of at least $10^3$.

13. The dielectric material of claim 10, having a dielectric constant of at least $10^4$.

14. The dielectric material of claim 10, having a dielectric constant of at least $10^5$.

15. The dielectric material of claim 10, having a composition represented by the general formula (I):

$$R_v X_y Ni_z O \qquad (I)$$

wherein
R is the first alkali metal dopant;
X is the second metal dopant;
v, y and z are stoichiometric ratios and wherein
v is $0.001 \leq v \leq 0.35$;
y is $0.001 \leq y \leq 0.05$;
z is $0.60 \leq z \leq 0.998$; and
wherein v+y+z=1.

16. The dielectric material of claim 15, wherein v is $0.03 \leq v \leq 0.07$ and wherein y is $0.01 \leq y \leq 0.04$.

17. The dielectric material of claim 15, wherein v is about 0.05 and wherein y is about 0.02.

18. A capacitor comprising a pair of electrodes and a layer of dielectric material disposed between said electrodes, wherein said dielectric material comprises a nickel oxide base co-doped with a first alkali metal dopant and a second metal dopant selected from the group consisting of at least one of tin, antimony, indium, tungsten, iridium, scandium, gallium, vanadium, chromium, gold, yttrium, lanthanum, ruthenium, rhodium, molybdenum and niobium.

19. The capacitor of claim 18, wherein the dielectric material comprises the co-doped nickel oxide as the main component.

20. The capacitor of claim 18, wherein the co-doped nickel oxide is at least 95% by weight of the dielectric material.

* * * * *